Patented Mar. 22, 1932

1,850,840

UNITED STATES PATENT OFFICE

PAUL LAEUGER, OF BASEL, SWITZERLAND, ASSIGNOR TO THE FIRM J. R. GEIGY S. A., OF BASEL, SWITZERLAND

MANUFACTURE OF ACID DYESTUFFS OF THE PHENONAPHTHOSAFRANINE SERIES AND THE PRODUCTS

No Drawing. Application filed January 21, 1928, Serial No. 248,567, and in Germany January 31, 1927.

The U. S. patent application Ser. No. 166,021, filed February 4, 1927, discloses an improved manufacture of acid dyestuffs of the phenonaphthosafranine series, which can be obtained by condensing an unsymmetrical N-alkyl-paraphenylenediamine derivative having a sulpho-group in ortho position to the primary amino group according to the formula

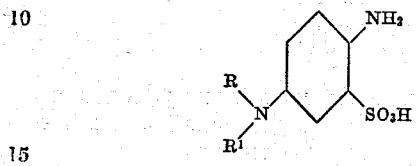

with an isorosindulinesulphonic acid of the general formula

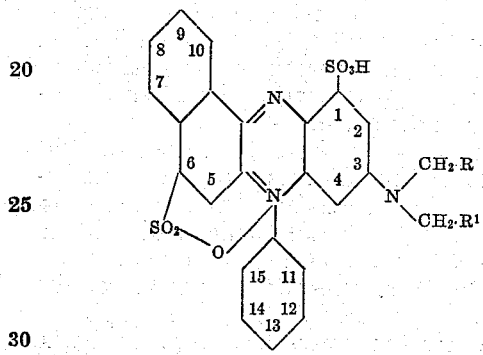

having at least two sulpho-groups, one of them being in position 6, the other in position 1, and a third, if it be present, in any position, whereby in the above formulæ R and $R^1$ stand for hydrogen or alkyl.

Now it has been found that new acid dyestuffs of the phenonaphthosafranine series can be made on the base of the aforesaid process when instead of isorosindulinesulphonic acids containing a sulpho-group in 1- or 2-position, sulphonic acids of such isorosindulines are used as contain no acid substituents in positions 1, 2 and 4.

The dyestuffs produced dye wool in an acid bath greenish blue, quiet tints of excellent fastness to light and alkali. They are probably of the general type:

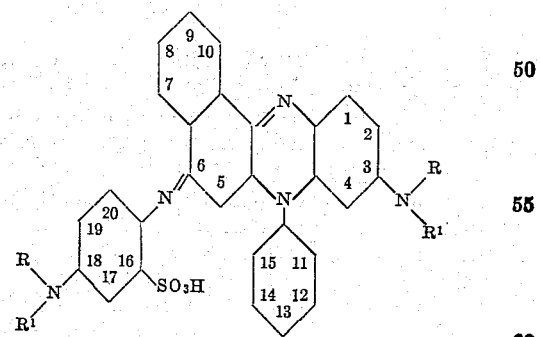

in which R and $R^1$ represent hydrogen or alkyl, whilst positions 1, 2 and 4 are free from any acid substituent. In this type there is always a sulpho-group in ortho-position (16-position) to the safranine-nitrogen and this appears to be the origin of the good fastness to alkali which the dyeings exhibit; at the same time the fastness to fulling is improved and the tint is shifted towards green-blue.

The isorosinduline-sulphonic acids used in the condensation contain one sulpho-group in 6-position, the other in one of the positions 8, 9, 12, 13, 14; the isorosinduline benzene nucleus (1:2:4) may have as substituents non-acid radicals, such as methyl, methoxyl or ethoxyl.

It is surprising that without acid substituents in positions 1 and 2 the good properties of the dyeings obtained with the dyestuffs of the aforesaid specification remain in these new dyestuffs, the more so because in French specification No. 571,368 the importance of the sulphonic group in ortho-position to the azine-nitrogen is particularly emphasized.

The isorosinduline-sulphonic acids used as intermediate products are made by the known process, namely by treating the neutral blue sulphonic acids of U. S. Patent 617,703 with a sulphite and oxidizing the leuco-acid thus formed. The positions 8, 9, 11 to 15 may be further substituted by alkyl-, alkyloxy-, hydroxy-, carboxy-, acidylamino-, sulphogroups or halogen.

The following examples illustrate the invention, the parts being by weight:—

Example 1

The phenonaphthosafranine - disulphonic acid of the probable constitution—

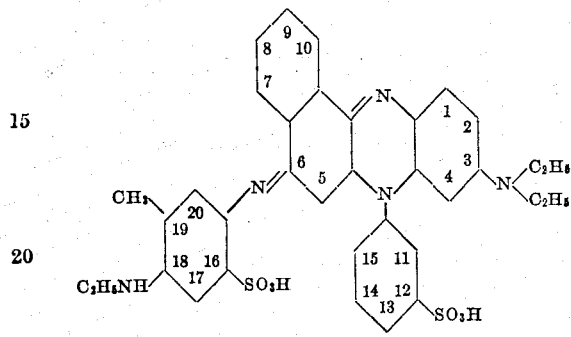

is made by heating to boiling in a reflux apparatus for 12 hours a mixture of 30 parts of meta-sulphophenyl-2-naphthyl-amine of 100 per cent. strength, 250 parts of alcohol and 26.6 parts of nitrosodiethylaniline of 100 per cent. strength. After cooling, the mixture is filtered at 25° C. and the solid matter washed with some alcohol. The diethyl-isorosinduline-12-monosulphonic acid thus made is converted into the disulphonic acid by means of 100 parts of commercial bisulphite according to the process described in U. S. patent specification No. 617,703. Into the solution thus obtained and amounting to about 800 parts, there is added a boiling hot solution of 23 parts of para-amino-monoethyl-ortho-toluidinesulphonic acid of 100 per cent. strength in 150 parts of water and 5 parts of sodium carbonate, and the whole is boiled for several hours in a reflux apparatus until a sample dissolved in concentrated sulphuric acid is pure green.

The dyestuff is salted out and dried. It dyes wool in an acid bath greenish blue, quiet tints of excellent fastness to light and alkali.

Example 2

For the nitrosodiethylaniline of Example 1 is substituted nitrosodiethyl-meta-toluidine and the procedure of that example is followed whereby a dyestuff of somewhat greener tint is obtained.

Example 3

For the meta - sulphophenyl - 2 - naphthyl-amine used in Example 1 there is substituted the corresponding para-compound, whereby there is obtained a similar dyestuff of like properties.

Instead of diethylisorosinduline-12-monosulphonic acid, dimethyl-isorosinduline-12-monosulphonic acid, diethyl-isorosinduline-13-monosulphonic acid or any other isorosinduline sulphonic acid may be used which is free from any acid substituent in the 1-and 2-positions. Also para-amino-monomethyl-ortho-toluidinesulphonic acid or any other unsymmetrical N-alkyl-paraphenylenediamine derivative may be used for the reaction with the specified isorosinduline sulphonic acids.

What I claim is:

1. A process for the manufacture of acid dyestuffs of the phenonaphthosafranine series, consisting in treating an unsymmetrical N-alkyl-paraphenylenediamine derivative, having a sulpho group in ortho position to the free amino group with an isorosinduline sulphonic acid of the following general formula:

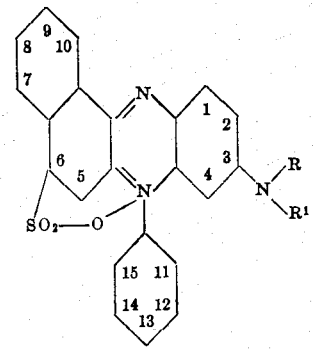

in which R and $R^1$ represent hydrogen or alkyl and in which the positions 1 and 2 are free from any acid substituent.

2. A process for the manufacture of acid dyestuffs of the phenonaphthosafranine series, consisting in treating an unsymmetrical N-alkyl-paraphenylenediamine derivative, having a sulpho group in ortho position to the free amino group, with a dialkyl-isorosinduline-sulphonic acid.

3. A process for the manufacture of acid dyestuffs of the phenonaphthosafranine series, consisting in treating para-amino-monoalkyl-ortho-toluidinesulphonic acid with a dialkyl-isorosinduline-sulphonic acid.

4. As new articles of manufacture, the herein described acid dyestuffs of the phenonaphthosafranine series, having probably the following formula:

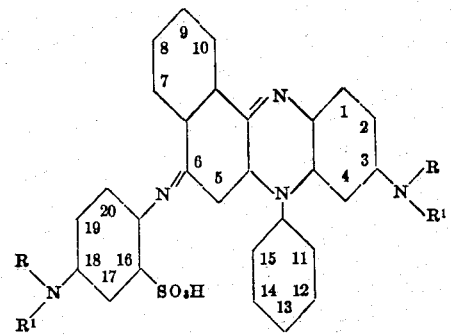

in which R and $R^1$ represent hydrogen or alkyl, whilst positions 1 and 4 are free from any acid substituent, said dyestuffs dyeing wool in an acid bath greenish blue, quiet tints of excellent fastness to light and alkali.

5. As new articles of manufacture, the herein described acid dyestuffs of the pheno-naphthosafranine series from para-amino-mono-alkyl-ortho-toluidine-sulphonic acid and a dialkyl-isorosinduline-sulphonic acid, having the formula:

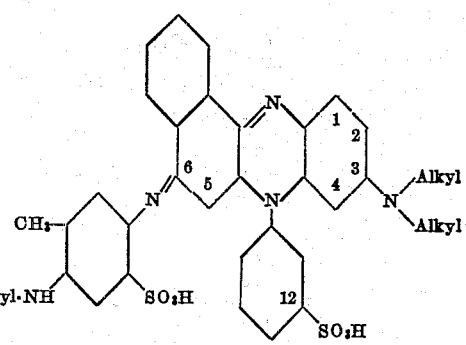

said dyestuffs dyeing wool in acid bath greenish blue, quiet tints of excellent fastness to light and alkali.

In witness whereof I have hereunto signed my name this 9th day of January, 1928.

PAUL LAEUGER.